(12) United States Patent
Gadgil et al.

(10) Patent No.: US 12,529,048 B2
(45) Date of Patent: Jan. 20, 2026

(54) DOUBLE KNOCK-OUT CHO CELL LINE METHOD OF ITS GENERATION AND PRODUCING THERAPEUTIC PROTEINS THEREFROM

(71) Applicant: ENZENE BIOSCIENCES LIMITED, Pune (IN)

(72) Inventors: Himanshu Gadgil, Pune (IN); Hatim Motiwala, Pune (IN); Arindam Chakraborty, Pune (IN); Gayatri Mulik, Pune (IN)

(73) Assignee: ENZENE BIOSCIENCES LIMITED, Pune (IN)

( * ) Notice: Subject to any disclaimer, the term of this patent is extended or adjusted under 35 U.S.C. 154(b) by 1038 days.

(21) Appl. No.: 17/259,950

(22) PCT Filed: Jul. 13, 2019

(86) PCT No.: PCT/IB2019/055991
§ 371 (c)(1),
(2) Date: Jan. 13, 2021

(87) PCT Pub. No.: WO2020/012446
PCT Pub. Date: Jan. 16, 2020

(65) Prior Publication Data
US 2021/0317435 A1    Oct. 14, 2021

(30) Foreign Application Priority Data

Jul. 13, 2018   (IN) .............. 201821026352

(51) Int. Cl.
| | | |
|---|---|---|
| C12N 15/10 | (2006.01) | |
| A61K 45/06 | (2006.01) | |
| C12N 9/00 | (2006.01) | |
| C12N 9/06 | (2006.01) | |
| C12N 9/22 | (2006.01) | |

(52) U.S. Cl.
CPC ............ C12N 15/102 (2013.01); A61K 45/06 (2013.01); C12N 9/003 (2013.01); C12N 9/22 (2013.01); C12N 9/93 (2013.01); *C12Y 105/01003* (2013.01); *C12Y 603/01002* (2013.01)

(58) Field of Classification Search
CPC ........ C12N 15/102; C12N 9/003; C12N 9/22; C12N 9/93; C12N 15/1137; C12N 2310/20; A61K 45/06; C12Y 105/01003; C12Y 603/01002; C07K 2317/14; C07K 16/00
See application file for complete search history.

(56) References Cited

U.S. PATENT DOCUMENTS

2018/0334665 A1*  11/2018  Yu .................... C12N 15/67

FOREIGN PATENT DOCUMENTS

| | | | | |
|---|---|---|---|---|
| CN | 104946687 A | | 9/2015 | |
| WO | WO-2010053518 A2 | * | 5/2010 | ............ C07K 14/00 |
| WO | WO-2012148497 A2 | * | 11/2012 | ............ C40B 30/04 |
| WO | 2017173063 A1 | | 10/2017 | |
| WO | WO-2017173043 A1 | * | 10/2017 | ............ A61K 48/00 |

OTHER PUBLICATIONS

Jakobovits, A. et al. 'From XenoMouse technology to panitumumab, the first fully human antibody product from transgenic mice'. Nature Biotechnology. vol. 25, No. 10 (Oct. 2007), pp. 1134-1143 (Year: 2007).*
Mossner, E. et al. "Increasing the efficacy of CD20 antibody therapy through the engineering of a new type II anti-CD20 antibody with enhanced direct and immune effector cell-mediated B-cell cytotoxicity." Blood, vol. 115, No. 22 (Jun. 3, 2010), pp. 4393-4402. (Year: 2010).*
Salles, G. et al. "Phase 1 study results of the type II glycoengineered humanized anti-CD20 monoclonal antibody obinutuzumab (GA101) in B-cell lymphoma patients". Blood, vol. 119, No. 22 (May 31, 2012), pp. 5126-5132 (Year: 2012).*
He, Y. et al. "Glutamine synthetase is essential in early mouse embyogenesis." Developmental Dynamics. vol. 236 (2007), pp. 1865-1875 (Year: 2007).*
NCBI sequence NW_003614063.1 (published Oct. 27, 2011)—Cricetulus griseus-pdf. (Year: 2011).*
Thomas Gaj et al: "ZFN, TALEN, and CRISPR/Cas-based methods for genome engineering", NIH Public Access Author Manuscript, vol. 31, No. 7, May 9, 2013 (May 9, 2013), pp. 1-20, XP055465031, DOI: 10.1016/j.tibtech.2013.04.004.
Wang Z et al: "[Dual gene amplification and selection system with dihydrofolate reductase and glutamine synthetase genes effectively increase the foreign gene exp . . . —PubMed—NCBI", Jan. 1, 2002 (Jan. 1, 2002), XP5563712, Retrieved from the Internet: URL: https://www,ncbi.nlm.nih.gov/pubmed/11986749 [ retrieved on Oct. 29, 2019].
Jayapal, Karthik & Wlaschin, K.F. & Hu, W.S. & Yap, M.G.S . . . (2007). Recombinant Protein Therapeutics from CHO Cells—20 Years and Counting. Chemical Engineering Progress. 103. 40-47.

(Continued)

*Primary Examiner* — Neil P Hammell
*Assistant Examiner* — Alexandra Geraldine Dace Denito
(74) *Attorney, Agent, or Firm* — Simpson & Simpson, PLLC

(57) ABSTRACT

The present disclosure relates to providing an engineered CHO cell line wherein the two essential metabolic genes are knocked out. Particularly, the present invention relates to a double knockout CHO cell line (DHFR–/– and GS–/–) with disrupted Dihydrofolate Reductase (DHFR) and Glutamine Synthetase (GS) genomic loci. The double knockout CHO cell line (DHFR–/– and GS–/–) being suitable for expression of monoclonal antibodies, dimeric therapeutic proteins, Fab, single chain fragments, or the like. The present disclosure also provides method of generation of a double knock out CHO cell line (DHFR–/– and GS–/–) using gene selection and/or manipulating techniques such as CRISPR/Cas9 system, Zinc Finger Nuclease, TALEN, or the like. The present disclosure further provides method of selection of clones and production of therapeutic proteins of interest with increased titre.

5 Claims, 3 Drawing Sheets

Specification includes a Sequence Listing.

(56) References Cited

OTHER PUBLICATIONS

Wurm, F. Production of recombinant protein therapeutics in cultivated mammalian cells. Nat Biotechnol 22, 1393-1398 (2004). https://doi.org/10.1038/nbt1026.

Randal J. Kaufman, Phillip A. Sharp, Amplification and expression of sequences cotransfected with a modular dihydrofolate reductase complementary DNA gene, Journal of Molecular Biology, vol. 159, Issue 4, 1982, pp. 601-621, ISSN 0022-2836, https://doi.org/10.1016/0022-2836(82)90103-6. (http://www.sciencedirect.com/science/article/pii/0022283682901036).

Targeted gene knockout in mammalian cells by using engineered zinc-finger nucleases Yolanda Santiago, Edmond Chan, Pei-Qi Liu, Salvatore Orlando, Lin Zhang, Fyodor D. Urnov, Michael C. Holmes, Dmitry Guschin, Adam Waite, Jeffrey C. Miller, Edward J. Rebar, Philip D. Gregory, Aaron Klug, Trevor N. Collingwood Proceedings of the National Academy of Sciences Apr. 2008, 105 (15) 5809-5814; DOI: 10.1073/pnas.0800940105.

* cited by examiner

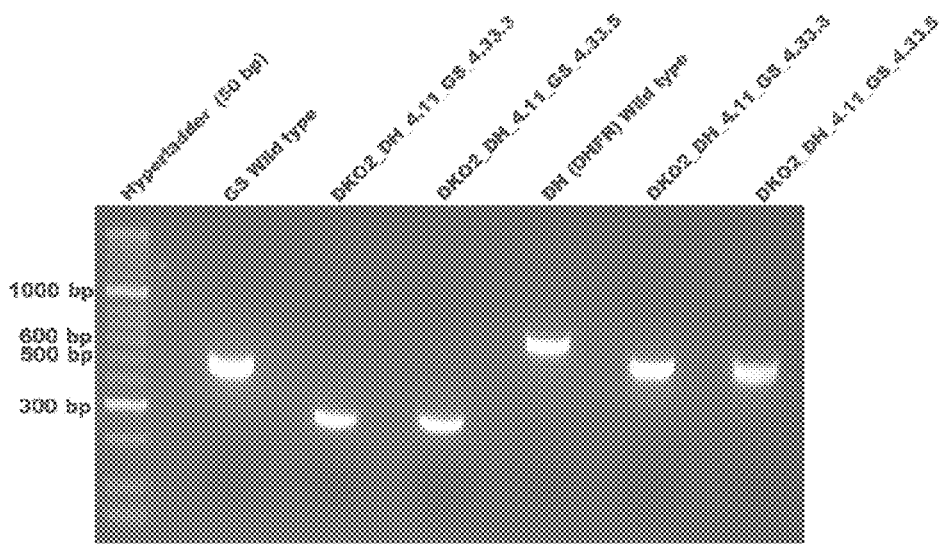

Figure 1

```
>WT-DHFR      : SEQ ID NO 1
CTGCCGTATGTCGACGCTGACTGCATCGTCGCCGTGTCCCAGAATATGGGCATCGGCAAGAACGGAGACCTTCCCTGGCCAATGCTCAGGTACT
GGCTGGATTGGGTTAGGGAAACCGAGGCGGTTCGCTGAATCGGGTCGAGCACTTGGCGGAGACGCGCGGGCCAACTACTTAGGGACAGTCATGA
GGGGTAGGCCCGCCGGCTGCAGCCCTTGCCCATGCCCCGCGGTGATCCCCATGCTGTGCCAGCCTTTGCCCAGAGGCGCTCTAGCTGGGAGCAAA
GTCCGGTCACTGGGCAGCACCACCCCCCGGACTTGCATGGGTAGCCGCTGAGATGGAGCCTGAGCACACGTGACAGGGTCCCTGTTAACGCAGT
GTTTCTCTAACTTTCAGGAACGAATTCAAGTACTTCCAAAGAATGACCACCACCTCCTCAGTGGAAGGTAATTTGGGGTTAAGATGAGGATTCT
AGGGTTTGTATGAAGCAAGATTTCCAATGCAGACGTGGAAGTGCGAAGTCTCCCGTGGGAATCTGGGAACTTTGCTTCTTGGCAGAAATTTTTG
TGCTGTTCCCAGAGTTTATTAAGCATCCTCTTTAATATACAAATATTTGAAATTTTGTTAGCAAGAGCAGTAAACTGGACAAAA
                                : SEQ ID NO 2
>DKO_Cln33_Clvg_DHFR (DKO2_DH_4.11_GS_4.33)

CTGCCGGTCGATCGACGCTGACTGCATCGTCGCCGTGTCCCAGAATATGGGCATCGGCAAGAACGGAGACCTTCCCTGGCCAATGCTCAGGTACT
GGCGGTGATCCCCATGCTGTGCCAGCCTTTGCCCAGAGGCGCTCTAGCTGGGAGCAAAGTCCGGTCACTGGGCAGCACCACCCCCCGGACTTG
CATGGGTAGCCGCTGAGATGGAGCCTGAGCACACGTGACAGGGTCCCTGTTAACGCAGTGTTTCTCTAACTTTCAGGAACGAATTCAAGTACTT
CCAAAGAATGACCACCACCTCCTCAGTGGAAGGTAATTTGGGGTTAAGATGAGGATTCTAGGGTTTGTATGAAGCAAGATTTCCAATGCAGACG
TGGAAGTGCGAAGTCTCCCGTGGGAATCTGGGAACTTTGCTTCTTGGCAGAAATTTTTGTGCTGTTCCCAGAGTTTATTAAGCATCCTCTTTAA
TATACAAATATTTGAAATTTTGTTAGCAAGAGCAGTAAACTGGACAAAA
```

Figure 2

```
>WT_GS : SEQ ID NO 3

GGGACGTATCAACCATCTCCTCACCGCTCTCTTTGCCTCGTTCTCGTGGCTTGTGGCCCTGTCCACCCTG
TCCATCATCCCGCCAGCCACCACTCAGAACACCTTCCACCATGGCCACCTCAGCAAGTTCCCACTTGAAC
AAAGGCATCAAGCAAATGTACATGTCCCTGCCCCAGGGTGAGAAAGTCCAAGCCATGTATATCTGGGTTG
ATGGTACCGGAGAAGGACTGCGCTGCAAAACCCGCACCCTGGACTGTGAGCCCAAGTGTGTAGAAGAGTT
ACCTGAGTGGAATTTTGATGGCTCTAGTACCTTTCAGTCTGAGGGCTCCAACAGTGACATGTATCTCAGC
CCTGTTGCCATGTTTCGGGACCCCTTCCGCAAAGAGCCCAACAAGCTGGTGTTCTGGAACTTGAA
CAAACGGAAGCCTGCAGAGACCAATTTAAGACACACGTGTAAACGGATAATGGACTTGGTGAGCAAG

>DKO_Clvg_GS : SEQ ID NO 4

CTGAATTGTGATCAACCATCTCCTCACCGCTCTCTTCGCCTCGTTCTCGTGGCTTGTGGCCCTGTCCACC
CTGTCCATCATCCCGCCAGCCACCACTCAGAACACCTTCCACCATGGCCACCTCAGCAAGTTCCCACTTG
AACAAAGGCATCAAGCAAATGTACATGTCCCTGCCCCAGGGTGAGAAAGTCCAAGCCATGTATATCTGGG
TTAACGGAAGCCTGCAAAGACCAATTTAAAACACACGTGTAAACGGATAATGGACATGGTGAGCAATTT
A
```

Figure 3

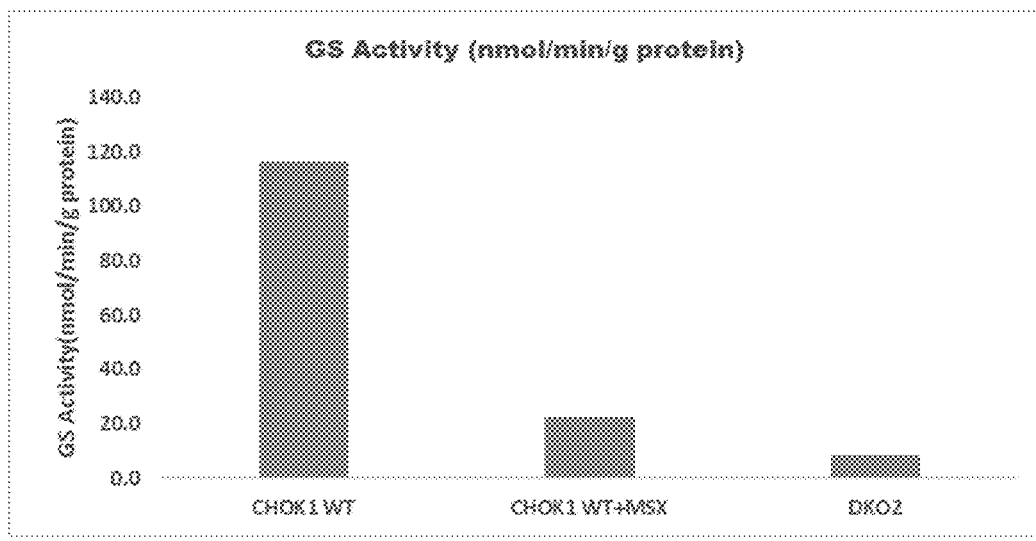

Figure 4

DOUBLE KNOCK-OUT CHO CELL LINE METHOD OF ITS GENERATION AND PRODUCING THERAPEUTIC PROTEINS THEREFROM

TECHNICAL FIELD

The present disclosure relates to an engineered CHO cell line wherein the two essential metabolic genes are knocked out. Particularly, the present invention relates to the generation of a double-knock out CHO cell line by disrupting the Glutamine Synthetase (GS) and Dihydrofolate Reductase (DHFR) genes. The present invention further relates to production of therapeutic proteins for example monoclonal antibodies, and dimeric therapeutic proteins in the double-knock out CHO cell line of the present disclosure.

BACKGROUND

Background description includes information that may be useful in understanding the present invention. It is not an admission that any of the information provided herein is prior art or relevant to the presently claimed invention, or that any publication specifically or implicitly referenced is prior art.

Chinese Hamster Ovary (CHO) cells are the most widely used industry host for the manufacturing of therapeutic proteins and monoclonal antibodies. About 70% of all recombinant proteins produced are made in CHO cells, including the lineages like DUXB11, DG44 and CHO-K1 (Chem Eng Prog.; 103: 40-47 (2007)) as they are easy to culture in suspension and can produce human-compatible therapeutic proteins. However, these are associated with significantly low expression yield and difficulty in scale-up of the production of therapeutic proteins, specifically antibodies, which need to be produced in kilogram quantities, and thus wild type CHO cells are not suitable for a large-scale production of the molecules like antibodies. Hence, there is need for approaches to improvise CHO cell lines for improving the expression of a desired target gene.

One of the approaches for increasing the expression levels is amplification of the integrated gene, by cloning the gene into the vector engineered with gene amplification system. Host cells are typically required to be transfected with a DNA vector encoding both the protein of interest and the selection marker on the same vector, while generating clones expressing a recombinant protein from expression vectors. Thus, selectable marker allows the selection of high producing clones comprising the expression vector. Selectable markers known in the art include glutamine synthetase (GS), G418, zeomycin, hygromycin, puromycin, dihydrofolate reductase (DHFR), and hypoxanthine-guanine phosphoribosyltransferase (HPRT).

Glutamine synthetase (GS) is a crucial enzyme for the bio-synthesis of essential amino acid L-glutamine. GS is frequently used as a selection marker gene (Nat Biotechnol.; 22:1393-1398, (2004)), where the endogenous GS enzyme activity is blocked by methionine sulfoximine (MSX) to achieve selection of recombinant protein co-expressing the exogenous GS. However, when the cells transfected with the vector comprising the genes for desired protein and GS are treated with the GS-specific inhibitor, such system produces low yield of the desired protein. The amount of protein produced further decreases on culturing of such transfected cells over a long time. Hence, to improve the amount of the desired protein, there is a need to further improve such CHO expression system using GS as a selectable marker. DHFR is another essential enzyme that converts dihydrofolate to tetrahydro folate, an essential carrier of one-carbon units in the biosynthesis of thymidylate, purine nucleotides, glycine and methyl compounds. DHFR is one of the most widely used and best characterized selection marker genes for recombinant protein expression and is used in conjunction with dihydrofolatereductase (DHFR)-based methotrexate (MTX) selection (J Mol Biol.; 159:601-621, (1982)). However, the DHFR system suffers from the shortcoming that isolation of single cell line capable of expressing improved levels of protein takes several months. Further, over a period the cell becomes resistant to MTX, and even with an increase in MTX concentration, the desired gene cannot be amplified anymore. Furthermore, revertants may appear in the CHO DUX cells used for DHFR system. Hence, there has been need for the development of an improved gene expression system for efficient protein production.

Thus, there is a need in the art for improved system for expressing the recombinant protein of which production is desired for example Monoclonal antibody (MAb). MAb production in CHO cells has been the focus of many biological processes. Expression levels afforded by the available approaches often are too low to produce such therapeutic proteins at desired levels. Traditionally, the light chain (LC) and heavy chain (HC) containing constructs are co-transfected in different ratios to get a high expressing mAb molecule. In this context, the over-expression of light chain is desirable to secrete the properly folded mAb out of the cells. However, such over-expression at times results in the generation of impurities such as free light chains, cysteinylated light chain and light chain dimers. These impurities generate anti-allotype antibodies and hence pose safety issues. Hence, there is need to achieve metabolic engineering of CHO cell line for stringent selection of transfectants and reduction of light chain impurities at clonal level by modulating the expression within the cells. Adopting a precise genome targeting technology is accordingly therefore need of an hour. Single and multi-allelic gene knockout in CHO cells were previously established to enhance the expression of recombinant protein using Zinc finger nuclease (ZFN), a process with insufficient genome editing and sufficiently laborious to limit the application (Biotechnol Bioeng. 2010; 106:97-105; Proc Natl Acad Sci USA. 2008; 105:5809-5814). Hence, though the genome-editing techniques such as designer zinc fingers, transcription activator-like effectors (TALEs), or homing meganucleases are available, there still remains a need for approaches that can select and optimize the expression of the heavy chain and light chain containing constructs for the production of therapeutic proteins with increased titre.

SUMMARY

This summary is provided to introduce a selection of concepts in a simplified form that are further described below in Detailed Description section. This summary is not intended to identify key features or essential features of the claimed subject matter, nor is it intended to be used as an aid in determining the scope of the claimed subject matter.

Accordingly, in one aspect, the present disclosure provides a double-knockout CHO cell line.

In one specific aspect, the present disclosure provides a double knockout CHO cell line (DHFR−/− and GS−/−) with disrupted Dihydrofolate Reductase (DHFR) and Glutamine Synthetase (GS) genomic loci.

In another aspect the present disclosure provides method for improving a wild type CHO cell line and generating an engineered double-knockout CHO cell line by disrupting the Glutamine Synthetase (GS) and Dihydrofolate Reductase (DHFR) genes.

In an aspect, the present disclosure provides a method of generating a double knockout CHO cell line (DHFR$^{-/-}$ and GS$^{-/-}$) wherein method employs one or more of gene selection and manipulation tools selected from CRISPR/Cas9 system, Zinc Finger Nuclease, TALEN or the like.

In a specific aspect, the present disclosure provides a method for generating a double-knock out CHO cell line (DHFR$^{-/-}$ and GS$^{-/-}$) comprising the steps:
 a) designing gRNAs against GS locus and DHFR locus of the CHO genome;
 b) transfecting gRNAs pair targeting DHFR locus along with Cas9 and a linear template of the antibiotic resistant gene expression cassettes into CHO-K1 cells;
 c) selecting clones with complete disruption at DHFR locus (DHFR$^{-/-}$);
 d) expanding the selected clones and re-transfecting a pair of gRNAs targeting GS locus along with Cas9 into CHO-K1 cells; and
 e) selecting the double knock out clones with complete disruption at DHFR and GS genomic locus (DHFR$^{-/-}$+ GS$^{-/-}$).

In one specific aspect, the present disclosure provides a double knockout CHO cell line (DHFR−/− and GS−/−) for expression of therapeutic proteins for example monoclonal antibodies and dimeric therapeutic proteins.

In yet another aspect, the present disclosure provides a cloning platform using double knockout for mammalian expression vector for antibody production wherein light chain is cloned in expression vector with GS marker and heavy chain is cloned in expression vector with DHFR marker and vice-a-versa.

In further aspect, the present disclosure provides a cloning platform using double-knockout for mammalian expression vector for antibody production wherein light chain and heavy chain expression can be optimized using MSX and MTX in the culture medium.

In another aspect the present disclosure provides method for producing therapeutic proteins employing the double-knockout CHO cell line.

In another aspect, the present disclosure provides a method for producing therapeutic proteins employing double-knockout CHO cell line in the fed-batch and continuous bioprocess.

BRIEF DESCRIPTION OF DRAWINGS

The following drawings form part of the present specification and are included to further illustrate aspects of the present disclosure. The disclosure may be better understood by reference to the drawings in combination with the detailed description of the specific embodiments presented herein.

FIG. 1 is a picture of the gel electrophoresis confirming the CRISPR/Cas9-mediated disruption of the dihydrofolate reductase (DHFR) and glutamine synthetase gene in CHO-K1 cells and the generation of a double-knockout cell lines (DHFR−/−+GS−/−).

FIG. 2 shows DNA sequences of DHFR locus of wild type CHO-K1 cells as SEQ ID NO. 1 and the sequence of the double-knockout CHO-K1 cells as per one of the exemplary embodiments as SEQ ID NO. 2 showing the deletion at the DHFR locus.

FIG. 3 shows DNA sequences of GS locus of wild type in CHO-K1 cells as SEQ ID NO. 3 and the sequence of the double-knockout CHO-K1 cells as per one of the exemplary embodiments, as per SEQ ID NO. 4 confirming the deletion at the GS locus.

FIG. 4 is a graph showing GS activity in CHO-K1 and double knock-out cell lines.

DETAILED DESCRIPTION

Figure 5:
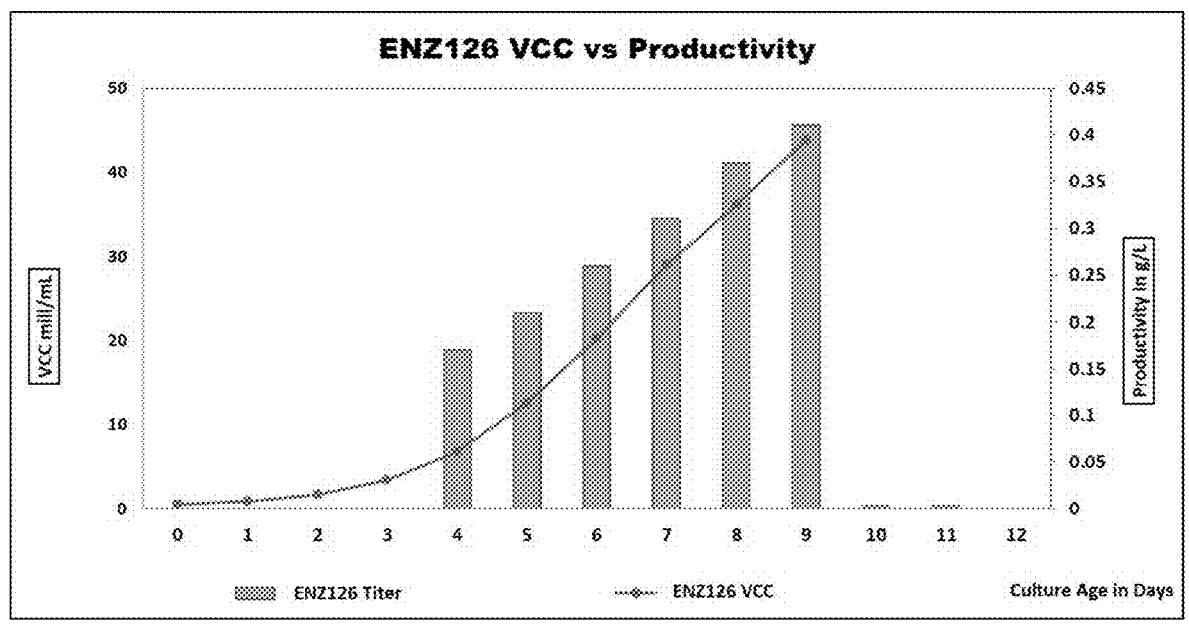
FIG. 5 is a graph elucidating expression of monoclonal antibody in Double knock-out CHO Cell Line.

The following is a detailed description of embodiments of the disclosure. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context requires otherwise, throughout the specification which follow, the word "comprise" and variations thereof, such as, "comprises" and "comprising" are to be construed in an open, inclusive sense that is as "including, but not limited to."

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The description that follows, and the embodiments described therein, is provided by way of illustration of an example, or examples, of particular embodiments of the principles and aspects of the present disclosure. These examples are provided for the purposes of explanation, and not of limitation, of those principles and of the disclosure.

It should also be appreciated that the present disclosure can be implemented in numerous ways, including as a system, a method or a device. In this specification, these implementations, or any other form that the invention may take, may be referred to as processes. In general, the order of the steps of the disclosed processes may be altered within the scope of the invention.

The headings and abstract of the invention provided herein are for convenience only and do not interpret the scope or meaning of the embodiments.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Various terms as used herein are shown below. To the extent a term used in a claim is not defined below, it should be given the broadest definition persons in the pertinent art have given that term as reflected in printed publications and issued patents at the time of filing.

The term "Glutamine Synthetase (GS)", as used herein referred to the metabolic enzyme (Primary accession number P04773) which catalyzes the condensation of glutamate and ammonia to form glutamine. In several mammalian cell lines where endogenous expression of GS is quite low, GS can be used efficiently as a selection marker to identify transformants simply by omitting glutamine from the media. Moreover, addition of a GS inhibitor methionine sulphoximine (MSX) further allows the selection of clones producing relatively high levels of transfected glutamine synthetase, thereby, selecting the high titer clone co-expressing the recombinant protein of interest.

The term "Dihydrofolate reductase (DHFR)", as herein referred to the metabolic enzyme (Primary accession number Q2MH30), that reduces dihydrofolic acid to tetrahydrofolic acid using NADPH as electron donor for de novo synthesis of purines, thymidylic acid and certain amino acids. DHFR is widely used as a marker to select transformants. The exogenously expressed DHFR (along with gene of interest) confers methotrexate (MTX) resistance and thereby rapidly eliminates the non-transfected cells growing in a media lacking hypoxanthine-thymidine (HT).

The term "CRISPR/Cas", as used herein referred to a technology known as CRISPR (clustered, regularly interspaced short palindromic repeats)/Cas9 (CRISPR associated protein 9) which has a potential to achieve precise genome editing. CRISPR/Cas9 uses a protein-RNA complex composed of the Cas9 nuclease bound to a guide RNA (gRNA) molecule designed to recognize a particular DNA sequence. The gRNA molecule activates and guides the Cas9 nuclease to a target location in the genome that requires repair or modification for example gene editing, knockout, activation, repression, or identification/imaging. The genomic target can be any ~20 nucleotide DNA sequence, provided the sequence is unique compared to the rest of the genome, and the target is immediately upstream of a protospacer adjacent motif (PAM). Once there, the complex makes a specific cut in the DNA. Subsequently, the site of cleavage would be repaired by non-homologous end joining (NHEJ) pathway or homology directed repair (HDR) pathway.

The term "CHO cells", as used herein are the established cell line derived from Chinese hamster (*Cricetulus griseus*) ovary cells.

The term "therapeutic protein" means a recombinant protein that has been sufficiently purified or isolated from contaminating proteins, lipids, and nucleic acids present in a liquid culture medium or from a host cell for example a mammalian, yeast, or bacterial host cell and biological contaminants for example viral and bacterial contaminants, and can be formulated into a pharmaceutical product. Representative examples of therapeutic protein include, but are not limited to, an antibody, an antibody fragment, a monoclonal antibody, an enzyme, an engineered protein, an immunogenic protein, protein fragment, and an immunoglobulin.

In an embodiment the present disclosure provides a double-knockout CHO cell line.

In one embodiment the present disclosure provides a double knockout CHO cell line (DHFR−/− and GS−/−) with disrupted Dihydrofolate Reductase (DHFR) and Glutamine Synthetase (GS) genomic loci.

In an embodiment the present disclosure provides a method for improving a wild type CHO cell line and generating an engineered double-knockout CHO cell line by disrupting the Glutamine Synthetase (GS) and Dihydrofolate Reductase (DHFR) gene.

In one embodiment the present disclosure provides a method of generating a double knockout CHO cell line (DHFR−/− and GS−/−).

In one embodiment the present disclosure provides a method of generating double-knockout CHO cell line (DHFR−/− and GS−/−) wherein the method employs one or more of gene selection and manipulation tools selected from CRISPR/Cas9 system, Zinc Finger Nuclease, TALEN or the like.

In one embodiment the present disclosure provides a plasmid comprising nucleotides encoding a wild type Streptococcus pyogenes Cas9 protein, and two sgRNA vectors where two different target sequences are cloned between the U6 promoter and the guide RNA scaffold sequences (chimeric crRNA-tracrRNA coding sequence).

In a specific aspect, the present disclosure provides a method for generating a double-knock out CHO cell line (DHFR−/− and GS−/−) comprising the steps:
 a) designing gRNAs against DHFR locus and GS locus of the CHO genome;

b) transfecting gRNAs pair targeting DHFR locus along with Cas9 and a linear template of the antibiotic resistant gene expression cassettes into CHO-K1 cells;

c) selecting clones with complete disruption at DHFR locus (DHFR$^{-/-}$);

d) expanding the selected clones and re-transfecting a pair of gRNAs targeting GS locus along with Cas9 into CHO-K1 cells; and e) selecting the double knock out clones with complete disruption at DHFR and GS genomic locus (DHFR$^{-/-}$+ GS$^{-/-}$).

In an embodiment the present disclosure provides a double knockout CHO cell line (DHFR−/− and GS−/−) for expression of monoclonal antibodies and dimeric therapeutic proteins. The double KO CHO cell line (DHFR−/− and GS−/−) of the present disclosure gives strong selection of transfectants.

In an embodiment the present disclosure provides a cloning platform using double knockout mammalian expression vector for antibody production wherein light chain is cloned in expression vector with GS marker and heavy chain is cloned in expression vector with DHFR marker and vice-a-versa.

In further embodiment the present disclosure provides a cloning platform using double knockout mammalian expression vector for antibody production wherein light chain and heavy chain expression can be optimized using MSX and MTX in the culture medium.

In one embodiment, the present disclosure provides a method for producing a therapeutic protein comprising the steps:

i) cloning a heavy-chain (HC) gene in a gene expression vector with a human dihydrofolate reductase (hDHFR) ORF as selection marker and cloning a light-chain (LC) gene in a expression vector with Glutamine synthetase (GS) ORF as selection marker;

ii) co-transfecting HC and LC expressing constructs in double knockout CHO-K1 cells (DHFR−/−+GS−/−);

iii) selecting transformants;

iv) selecting a high titre clone; and v) cultivating selected clones under conditions suitable for the production of the protein of interest.

In one embodiment, the transformants are selected in a media lacking glutamine and hypoxanthine-thymidine (HT).

In one embodiment the transformants are selected in the presence of GS inhibitor methionine sulphoximine (MSX) and DHFR inhibitor methotrxate (MTX);

In one embodiment the high titre clone is selected by limited dilution plating or by an automated system. The selected clone is used for carrying out and expansion and banking. Selected clones are used for optimization of cell growth and expression of protein of interest in a suitable cell culture medium and culture conditions at shake flask or small scale reactor.

In one specific embodiment, the present disclosure provides a method for producing a therapeutic protein comprising the steps:

i) cloning a heavy-chain (HC) gene in a gene expression vector with a human dihydrofolate reductase (hDHFR) ORF as selection marker and cloning a light-chain (LC) gene in a expression vector with Glutamine synthetase (GS) ORF as selection marker;

ii) co-transfecting HC and LC expressing constructs in double knockout CHO-K1 cells (DHFR$^{-/-}$+GS$^{-/-}$);

iii) selecting transformant in a media lacking glutamine and hypoxanthine-thymidine (HT) and in the presence of GS inhibitor methionine sulphoximine (MSX) and DHFR inhibitor methotrxate (MTX);

iv) selecting high titer clone by limited dilution plating or by an automated system, carrying out expansion and banking; and v) optimizing cell growth and expression at shake flask or small scale reactor.

In an embodiment the present disclosure provides method for producing therapeutic proteins employing the double-knockout CHO cell line in the fed-batch and/or continuous bioprocess.

Examples of therapeutic proteins that can be prepared as per the method of the present disclosure of that can be comprised in the composition or formulation can include, but not limited to, an antibody, an antibody fragment, a monoclonal antibody, an enzyme, an engineered protein, an immunogenic protein, a protein fragment, an immunoglobulin and any combination thereof.

In one embodiment, monoclonal antibody is selected from a naturally occurring antibody or a recombinant antibody selected from monoclonal antibody, modified antibody, derivative of antibody and fragment of antibody or any combination thereof.

In one embodiment, the therapeutic protein can be selected from, but not limited to, panitumumab, omalizumab, abagovomab, abciximab, actoxumab, adalimumab, adecatumumab, afelimomab, afutuzumab, alacizumab, alacizumab, alemtuzumab, alirocumab, altumomab, amatuximab, amatuximab, anatumomab, anrukinzumab, apolizumab, arcitumomab, atinumab, tocilizumab, basilizimab, bectumomab, belimumab, bevacizumab, besilesomab, bezlotoxumab, biciromab, blinatumomab, canakinumab, certolizumab, cetuximab, cixutumumab, daclizumab, denosumab, eculizumab, edrecolomab, efalizumab, efungumab, epratuzumab, ertumaxomab, etaracizumab, figitumumab, golimumab, ibritumomab tiuxetan, igovomab, imgatuzumab, infliximab, inolimomab, inotuzumab, labetuzumab, lebrikizumab, moxetumomab, natalizumab, nivolumab, obinutuzumab, oregovomab, palivizumab, panitumumab, pertuzumab, ramucirumab, ranibizumab, rituximab, Secukinumab, tocilizumab, tositumomab, tralokinumab, tucotuzumab, trastuzumab, Ustekinumab, vedolizumab, veltuzumab, zalutumumab, zatuximab; enzyme including for example galactosidase like alpha-galactosidase, myozyme, or cerezyme; protein including human erythropoietin, tumor necrosis factor (TNF), or an interferon alpha or beta; or immunogenic or antigenic proteins or protein fragments for example proteins for use in a vaccine, alglucosidase alfa, laronidase, abatacept, galsulfase, lutropin alfa, antihemophilic factor, agalsidase beta, interferon beta-1a, darbepoetin alfa, tenecteplase, etanercept, coagulation factor IX, follicle stimulating hormone, interferon beta-1a, imiglucerase, dornase alfa, epoetin alfa, insulin or insulin analogs, mecasermin, factor VIII, factor VIIa, anti-thrombin III, protein C, human albumin, erythropoietin, granulocute colony stimulating factor, granulocyte macrophage colony stimulating factor, interleukin-11, laronidase, idursuphase, galsulphase, α-1-proteinase inhibitor, lactase, adenosine deaminase, tissue plasminogen activator, thyrotropin alpha, acid β-galactosidase, β-galactosidase, neuraminidase, hexosaminidase A, and hexosaminidase B.

The method of the present disclosure can produce therapeutic proteins with increased titre as a result of improved selection of transgenes.

According to embodiments of the present disclosure, a therapeutic protein prepared by/resulting from the method of the present disclosure can be formulated into a pharmaceutical composition.

In an embodiment, the present disclosure provides a pharmaceutical composition, comprising a therapeutic protein prepared by or resulting from the method in accordance with the present disclosure.

While the foregoing description discloses various embodiments of the disclosure, other and further embodiments of the disclosure may be devised without departing from the basic scope of the disclosure. The invention is not limited to the described embodiments, versions or examples, which are included to enable a person having ordinary skill in the art to make and use the invention when combined with information and knowledge available to the person having ordinary skill in the art.

EXAMPLES

The disclosure is further illustrated by the following examples which in no way should be construed as being further limiting. One skilled in art will readily appreciate that the specific methods are results described are merely illustrative.

Example 1

Generation of Double Knock out CHO Cell Line Using Gene Manipulation Technique CRISPR/Cas9

1. ZiFit Targeter program originally developed by the Keith Joung lab was used for designing gRNA against GS locus and DHFR locus of the CHO genome. gRNAs with fewest possible off-target sites were selected; a few of the gRNAs with SEQ ID NOs. 5-8 are listed in Table 1:

TABLE 1

List of gRNAs used

| SEQ ID NO. | gRNA | Sequence |
|---|---|---|
| 5 | CHO_dhfr_gRNA2 | GCCAATGCTCAGGTACTGGC |
| 6 | CHO_dhfr_gRNA3 | GCAGCCCTTGCCCATGCCCG |
| 7 | CHO_GS_gRNA2 | GCATGTATATCTGGGTTGA |
| 8 | CHO_GS_gRNA3 | GTGAAGTCTTCAAGTACAAC |

2. The Cas9 target site-specific oligos were synthesized from IDT. Inverse PCR was utilized to incorporate the target site between the U6 promoter and the guide RNA scaffold sequence of a template vector. Subsequently, the target sites were validated using DNA sequencing.
3. The CHO-K1 cells wild type for glutamine synthetase (GS) with DNA sequence listing as per SEQ ID NO. 1 and dihydrofolate reductase gene (DHFR) with DNA sequence as per SEQ ID NO. 3, were procured from Chasin Lab (Proc Natl Acad Sci. 1980; 77: 4216-4220). CHO-K1 adherent cells were first transfected with two DHFR gRNAs (targeting the adjacent DHFR gene locus), a hCas9 expressing plasmid and a linearized construct containing the ORF of puromycin resistance gene, promoter and poly-A site using lipid-based transfection reagent. Subsequently, puromycin selection was employed for a couple of generations to enrich the cells containing the desired Cas9/gRNA-targeted mutation. Single colonies were isolated and were further screened by growing in the medium with or without HT (hypoxanthine, thymidine). Final clone was selected using genomic PCR. Genomic DNA was isolated from the individual clones and PCR amplified using a primer pair flanking the Cas9 cleavage sites on DHFR locus. The final DHFR−/− homozygous clone having DNA sequence as per SEQ ID NO. 2 with the desired deletion at DHFR locus was named as DH_KO_4.11.
4. The DH_KO_4.11 clone was then re-transfected with a pair of GS gRNAs and hCas9 constructs for the generation of double knock-out CHO cells. SEQ ID NO. 4 shows deletion at GS locus.
5. Single colonies were further screened by growing in the medium with or without glutamine. 26 clones were analysed for mutation at the targeted sites using primer pair flanking the Cas9 cleavage sites on GS genomic locus.
6. The final double knock-out (DHFR−/−+GS−/−) homozygous clone with the desired deletion at GS locus was obtained. A second round of clonal selection was also performed. Finally, two clones were selected and designated as DKO2_DH_4.11_GS_4.33.3 and DKO2_DH_4.11_GS_4.33.5 (FIG. 1). In brief, genomic DNA isolated from the double knock-out cells were subjected to PCR amplification using the primer pairs flanking the site of cleavage of both the genes (DHFR and GS). Genomic DNA from wild type CHO-K1 was used as a control. The wild type CHO-K1 cells showed a band of ~500 bp (lane 2) corresponding to GS fragment while the knock-out cell line showed a smaller band of ~300 bp [lane 3 (clone: DKO2_DH_4.11_GS_4.33.3) & 4 (clone: DKO2_DH_4.11_GS_4.33.5)]. Similarly, the wild type CHO-K1 cells showed a band of ~700 bp (lane 5) corresponding to DHFR fragment while a knockout cell line could only amplify a DNA fragment of ~400 bp [lane 6 (clone: DKO2_DH_4.11_GS_4.33.3) & 7 (clone: DKO2_DH_4.11_GS_4.33.5)]. DNA sequencing of DHFR locus (FIG. 2) and GS locus (FIG. 3) of wild type and double-knockout CHO-K1 cells were performed using primers flanking the cleavage sites. The sequence confirmed the deletion at the locus. The highlighted regions represent the gRNA target sites.
7. The DKO2_DH_4.11_GS_4.33.3 clone was further scaled up and adapted for suspension culture in a chemically defined media.

Example 2

GS Activity of Double Knock Out CHO Cell Line

The GS enzymatic activity was measured in wild type (CHO-K1 WT) and double knock-out CHO cell line (DKO2). CHO-K1 WT treated with GS inhibitor MSX (CHO-K1-MSX) was kept as control. The GS activity was measured by a spectrophotometric assay by measuring the enzyme's transferase activity (conversion of α-glutamine to γ-glutamylhydroxamate) at a specific wavelength using a microplate reader (Deuel et al., J Biol Chem 253, 6111-6118). The GS activity was reported as nmol min-1 g protein-1. The double knock-out CHO cell line (DKO2) showed minimal enzymatic activity when compared to the wild type cells. The result confirmed the functional disruption of GS enzyme in the knock-out cells (FIG. 4).

Example 3

Expression of Monoclonal Antibody in Double Knock-Out CHO Cell Line

The monoclonal antibody (mAb), ENZ126 was cloned in the double knock-out cell line as described herein. The productivity of the final clone was tested in 2L stirred tank bioreactor (Sartorius Stedim) employing perfusion culture in a serum free and chemically defined cell culture media, CelliST™ Basal3 (Ajinomoto, Japan). The perfusion culture is a method of culturing cells over longer period in a bioreactor by continuously feeding the cells with fresh media and removing the spent media while keeping cells in culture. The rate of the perfusion was determined based on the viable cell counts. On Day 0, the bioreactor was seeded with 0.5+0.2×10E+6 cell/mL and bioreactor was run at 37° C., 5% $CO_2$ and default gas supply. The perfusion with cell culture medium was started from Day 3 whereby the spent media from bioreactor was removed using ATF system (Alternate Tangential Flow). With the increase in cell density over days, the perfusion rate increases and maximum perfusion rate reached on Day 9 was 1.5RV. The periodically harvested medium containing the protein of interest was processed for further downstream purification. The monoclonal antibody (mAb) titer was determined using a protein A affinity HPLC based method. Expression of ENZ126 was achieved 0.41 g/L/d on day 9 in bioreactor condition (FIG. 5).

We claims:

1. A double-knockout Chinese Hamster Ovary (CHO) cell line (DHFR$^{-/-}$+GS$^{-/-}$) with disrupted Dihydrofolate Reductase (DHFR) and Glutamine Synthetase (GS) genomic loci for expression or recombinant polypeptides, wherein the CHO cell line contains a disrupted DHFR gene comprising the polynucleotide sequence of SEQ ID NO: 2 and a disrupted GS gene comprising the polynucleotide sequence of SEQ ID NO: 4.

2. A cloning platform comprising the double knockout CHO cell line (DHFR$^{-/-}$+GS$^{-/-}$) according to claim 1 for antibody production.

3. A method for producing a recombinant polypeptide, comprising the steps of:
  a) cloning a nucleotide sequence encoding a heavy-chain (HC) or a nucleotide sequence encoding a light-chain (LC) of the recombinant protein in a gene expression vector bearing a human dihydrofolate reductase (hDHFR) gene as a selection marker or in a gene expression vector with Glutamine synthetase (GS) gene as selection marker;
  b) co-transfecting said gene expression constructs from step a) in double knockout CHO cells (DHFR$^{-/-}$+GS$^{-/-}$) as claimed in claim 1, wherein the CHO cells are CHO-K1 cells;
  c) selecting transformed double knockout CHO-K1 cells (DHFR$^{-/-}$+GS$^{-/-}$) in a media lacking glutamine and hypoxanthine-thymidine (HT) and in the presence of GS inhibitor methionine sulphoximine (MSX) and DHFR inhibitor methotrexate (MTX);
  d) seeding the double knockout CHO-K1 cells (DHFR$^{-/-}$+GS$^{-/-}$) on day 0 and culturing said cells in a stirred tank bioreactor employing perfusion culture in a serum free and chemically defined cell culture media at 37° C., 5% $CO_2$, and a default gas supply;
  e) initiating perfusion culture with fresh serum free and chemically defined cell culture media on day 3 and consecutively removing spent culture media with increase in perfusion rate as cell density increases, wherein the maximum perfusion rate is 1.5 RV on day 9;
  f) periodically harvesting the culture media containing the expressed recombinant polypeptide; and
  g) purifying the monoclonal antibody from the harvested culture media.

4. The method as claimed in claim 3, wherein the recombinant polypeptide is selected from an antibody, an antibody fragment, a monoclonal antibody, an enzyme, an engineered protein, an immunogenic protein, a protein fragment, an immunoglobulin and/or any combination thereof.

5. The method as claimed in claim 3, wherein the recombinant polypeptide is selected from omalizumab, abagovomab, abciximab, actoxumab, adalimumab, adecatumumab, afelimomab, afutuzumab, alacizumab, alemtuzumab, alirocumab, altumomab, amatuximab, anatumomab, anrukinzumab, apolizumab, arcitumomab, atinumab, basilizimab, bectumomab, belimumab, bevacizumab, besilesomab, bezlotoxumab, biciromab, blinatumomab, canakinumab, certolizumab, cetuximab, cixutumumab, daclizumab, denosumab, eculizumab, edrecolomab, efalizumab, efungumab, epratuzumab, ertumaxomab, etaracizumab, figitumumab, golimumab, ibritumomab tiuxetan, igovomab, imgatuzumab, infliximab, inolimomab, inotuzumab, labetuzumab, lebrikizumab, moxetumomab, natalizumab, nivolumab, obinutuzumab, oregovomab, palivizumab, panitumumab, pertuzumab, ramucirumab, ranibizumab, rituximab, Secukinumab, tocilizumab, tositumomab, tralokinumab, tucotuzumab, trastuzumab, Ustekinumab, vedolizumab, veltuzumab, zalutumumab, and zatuximab.

* * * * *

SEQUENCE LISTING

<160> NUMBER OF SEQ ID NOS: 8

<210> SEQ ID NO 1
<211> LENGTH: 648
<212> TYPE: DNA
<213> ORGANISM: Artificial Sequence
<220> FEATURE:
<223> OTHER INFORMATION: WT_DHFR

<400> SEQUENCE: 1

```
ctgccgtatg tcgacgctga ctgcatcgtc gccgtgtccc agaatatggg catcggcaag      60
aacggagacc ttccctggcc aatgctcagg tactggctgg attgggttag ggaaaccgag     120
gcggttcgct gaatcgggtc gagcacttgg cggagacgcg cgggccaact acttagggac     180
agtcatgagg ggtaggcccg ccggctgcag cccttgccca tgcccgcggt gatccccatg     240
ctgtgccagc ctttgcccag aggcgctcta gctgggagca aagtccggtc actgggcagc     300 accaccccc ggacttgcat gggtagccgc tgagatggag cctgagcaca cgtgacaggg     360
tccctgttaa cgcagtgttt ctctaacttt caggaacgaa ttcaagtact tccaaagaat     420
gaccaccacc tcctcagtgg aaggtaattt ggggttaaga tgaggattct agggtttgta     480
tgaagcaaga tttccaatgc agacgtggaa gtgcgaagtc tcccgtggga atctgggaac     540
tttgcttctt ggcagaaatt tttgtgctgt tcccagagtt tattaagcat cctctttaat     600
atacaaatat ttgaaatttt gttagcaaga gcagtaaact ggacaaaa                648
```

<210> SEQ ID NO 2
<211> LENGTH: 519
<212> TYPE: DNA
<213> ORGANISM: Artificial Sequence
<220> FEATURE:
<223> OTHER INFORMATION: DHFR cleavage

<400> SEQUENCE: 2

```
ctgcggtcga tcgacgctga ctgcatcgtc gccgtgtccc agaatatggg catcggcaag      60
aacggagacc ttccctggcc aatgctcagg tactccgcgg tgatccccat gctgtgccag     120
cctttgccca gaggcgctct agctgggagc aaagtccggt cactgggcag caccaccccc     180
cggacttgca tgggtagccg ctgagatgga gcctgagcac acgtgacagg gtccctgtta     240
acgcagtgtt tctctaactt tcaggaacga attcaagtac ttccaaagaa tgaccaccac     300
ctcctcagtg gaaggtaatt tggggttaag atgaggattc tagggtttgt atgaagcaag     360
atttccaatg cagacgtgga agtgcgaagt ctcccgtggg aatctgggaa ctttgcttct     420
tggcagaaat tttgtgctg ttcccagagt ttattaagca cctctttaa tatacaaata     480 tttgaaattt tgttagcaag agcagtaaac tggacaaaa                           519
```

<210> SEQ ID NO 3

```
<211> LENGTH: 488
<212> TYPE: DNA
<213> ORGANISM: Artificial Sequence
<220> FEATURE:
<223> OTHER INFORMATION: WT_GS

<400> SEQUENCE: 3
gggacgtatc aaccatctcc tcaccgctct ctttgcctcg ttctcgtggc ttgtggccct      60
gtccaccctg tccatcatcc cgccagccac cactcagaac accttccacc atggccacct    120
cagcaagttc ccacttgaac aaaggcatca agcaaatgta catgtccctg ccccagggtg    180
agaaagtcca agccatgtat atctggggttg atggtaccgg agaaggactg cgctgcaaaa    240
cccgcaccct ggactgtgag cccaagtgtg tagaagagtt acctgagtgg aattttgatg    300
gctctagtac ctttcagtct gagggctcca acagtgacat gtatctcagc cctgttgcca    360
tgtttcggga ccccttccgc aaagagccca acaagctggt gttctgtgaa gtcttcaagt    420
acaaccggaa gcctgcagag accaatttaa gacacacgtg taaacggata atggacttgg    480
tgagcaag                                                             488

<210> SEQ ID NO 4
<211> LENGTH: 281
<212> TYPE: DNA
<213> ORGANISM: Artificial Sequence
<220> FEATURE:
<223> OTHER INFORMATION: GS cleavage

<400> SEQUENCE: 4
ctgaattgtg atcaaccatc tcctcaccgc tctcttcgcc tcgttctcgt ggcttgtggc      60
cctgtccacc ctgtccatca tcccgccagc caccactcag aacaccttcc accatggcca    120
cctcagcaag ttcccacttg aacaaaggca tcaagcaaat gtacatgtcc ctgccccagg    180
gtgagaaagt ccaagccatg tatatctggg tcaaccggaa gcctgcaaag accaatttaa    240
aacacacgtg taaacggata atggacatgg tgagcaattt a                        281

<210> SEQ ID NO 5
<211> LENGTH: 20
<212> TYPE: RNA
<213> ORGANISM: Artificial Sequence
<220> FEATURE:
<223> OTHER INFORMATION: CHO_dhfr_gRNA2

<400> SEQUENCE: 5
gccaatgctc aggtactggc                                                 20

<210> SEQ ID NO 6
<211> LENGTH: 20
<212> TYPE: RNA
<213> ORGANISM: Artificial Sequence
<220> FEATURE:
<223> OTHER INFORMATION: CHO_dhfr_gRNA3

<400> SEQUENCE: 6
gcagcccttg cccatgcccg                                                 20

<210> SEQ ID NO 7
<211> LENGTH: 19
<212> TYPE: RNA
<213> ORGANISM: Artificial Sequence
<220> FEATURE:
<223> OTHER INFORMATION: CHO_GS_gRNA2
```

```
<400> SEQUENCE: 7
gcatgtatat ctgggttga                                                19

<210> SEQ ID NO 8
<211> LENGTH: 20
<212> TYPE: RNA
<213> ORGANISM: Artificial Sequence
<220> FEATURE:
<223> OTHER INFORMATION: CHO_GS_gRNA3

<400> SEQUENCE: 8
gtgaagtctt caagtacaac                                               20
```